April 13, 1943.  H. C. JAMES  2,316,168
RAKE
Filed July 30, 1940
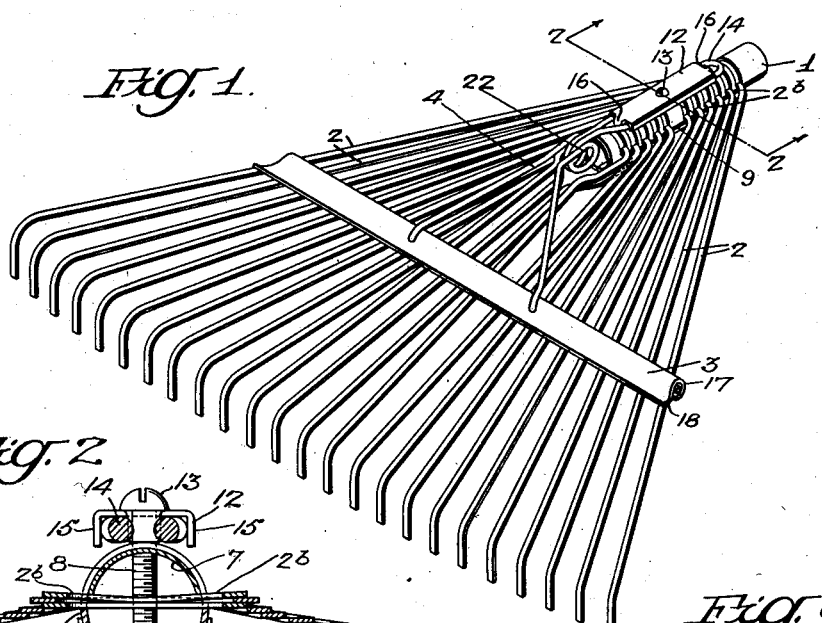
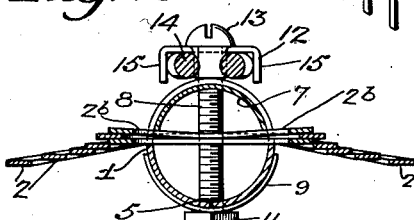
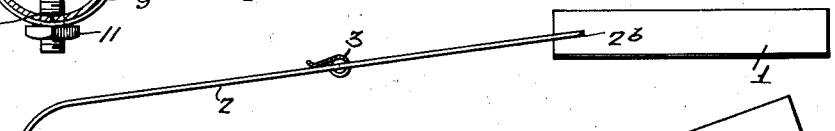
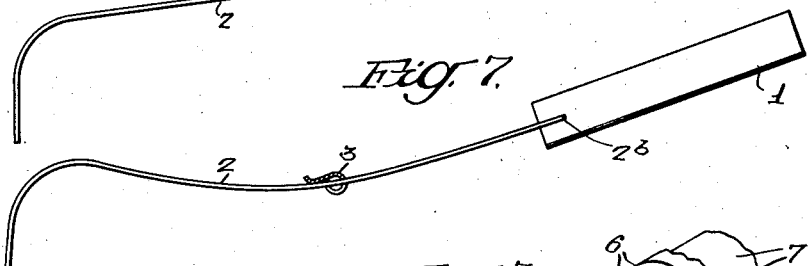
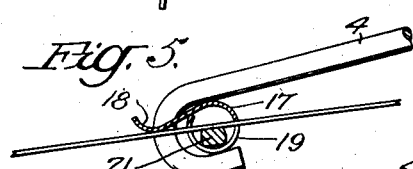
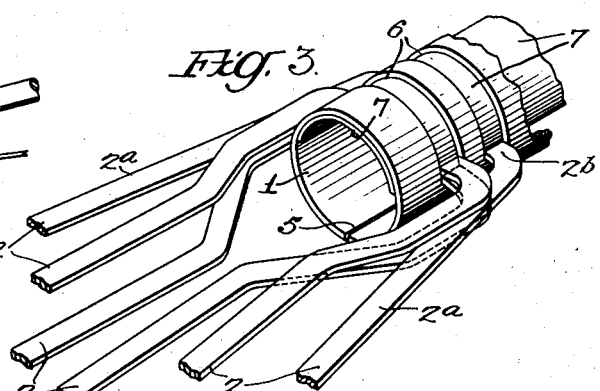
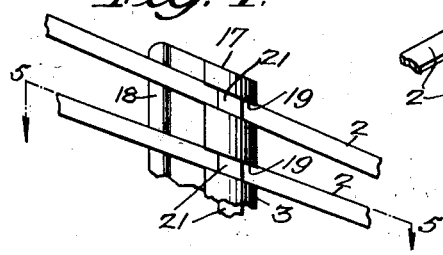
Inventor:
Howard C. James
by his Attorneys
Howson & Howson Patented Apr. 13, 1943

2,316,168

UNITED STATES PATENT OFFICE 2,316,168

RAKE

Howard C. James, Philadelphia, Pa., assignor to Henry Disston & Sons, Incorporated, Tacony, Pa., a corporation of Pennsylvania Application July 30, 1940, Serial No. 348,588

6 Claims. (Cl. 56—400.17)

This invention relates to improvements in lawn rakes of the general type disclosed in U. S. Patent No. 2,137,795, and the principal object of the invention is to provide a rake of this type having certain improved structural and functional characteristics hereinafter set forth.

A more specific object of the invention is to provide a rake of the type set forth wherein the metal tines shall be free from critical bending stresses, and wherein the strains imposed upon the individual tines shall be distributed relatively uniformly over the entire lengths of the latter.

Another object of the invention is to provide a rake of the stated type wherein the tines, while exhibiting a desirable degree of flexibility in the one direction which permits the working tips to conform readily to uneven ground surfaces, shall have also substantially throughout their respective lengths a relatively great degree of lateral rigidity tending to prevent the spreading of the tines from their normal relative positions.

Still another object of the invention is to provide in a rake of the stated type a novel and improved form of means for relatively spacing the tines and for reinforcing the tines against excessive flexure, said spacing means being of a character to preclude acute bending of the tines in any localized area.

A still further object of the invention is to provide a rake of the stated type which shall be relatively rugged and capable of affording a relatively long period of trouble-free service.

The invention further resides in certain novel structural features hereinafter described and illustrated in the attached drawing, wherein:

Figure 1 is a view in perspective of a rake made in accordance with my invention;

Fig. 2 is a section on the line 2—2, Fig. 1;

Fig. 3 is a fragmentary view in perspective of a portion of the ferrule, showing the manner in which the tines are secured in the latter;

Fig. 4 is a fragmentary inverted plan view showing details of the tine-spacing device;

Fig. 5 is a section on the line 5—5, Fig. 4, and

Figs. 6 and 7 are diagrammatic side elevational views illustrating the manner in which the rake operates in distributing the strains imposed upon the individual tines.

With reference to the drawing, the rake comprises essentially a ferrule 1; a plurality of tines 2 which are secured in the ferrule and which extend divergently from the latter in a fanwise formation; a spacer 3 which engages the tines in an area intermediate the ferrule and the outer working tips of said tines; and a reinforcing spring 4 which is attached to the ferrule 1 and which extends forwardly over the series of tines to engage the spacer 3, and through the spacer to thereby resiliently reinforce the said tines.

Referring particularly to Figs. 1, 2 and 3, the tines are formed from substantially flat untwisted strips of resilient metal, preferably steel, of greater width than thickness, each strip being bent adjacent the midsection and in the plane of its flat surface so as to form in effect two individual tines joined together and diverging from an intermediate connecting portion, the two tines and the integral connecting portion lying substantially flatly in a common plane. This may be readily seen from Fig. 3 wherein the tines $2a$, $2a$ are integral parts of a single strip of resilient steel united by a transverse intermediate portion $2b$. The tines $2a$ with their connecting portion $2b$ constitute, in effect, a single tine unit, and the rake comprises a plurality of such units, as shown in Fig. 1, which vary as to degree of divergence of the individual component tines, so that when assembled as hereinafter described, the typical fan-like formation shown in Fig. 1 is produced.

The ferrule 1 consists of a metal tube which, in the present instance, is formed from sheet metal stock and which, therefore, is divided longitudinally, as indicated at 5. The tubular ferrule 1 is provided with a longitudinally arranged series of transverse slots 6 which embrace approximately 180° of the circumference of the cylinder and which correspond in width to the breadth of the tine strips. The slots 6, as illustrated, are adapted to receive the transverse intermediate portions $2b$ of the respective tine units, said portions lying flatly in the bottoms of the slots and being clamped in place by a semicylindrical clamping element 7 of thin metal which is inserted into the tubular ferrule, as best illustrated in Figs. 2 and 3, so that the longitudinal edges bear against the upper faces of the portions $2b$ of the respective tine units and thereby solidly confine the said portions in the bottoms of the slots. The tine units are thus assembled together in nested arrangement wherein the tines and the intermediate connecting portions all occupy a substantially common plane corresponding to the flat planes of the individual units.

The element 7 is positively held in place longitudinally of the ferrule by a bolt 8 which passes through the walls of the ferrule and through an aperture in the clamping element 7, this bolt 8 also constituting an element of a clamp which secures the spring 4 to the ferrule. The other elements of the clamp are shown in Figs. 1 and 2 and comprise an arcuate element 9 which engages the under side of the ferrule and forms a bearing for the nut 11 of the bolt 8, and an elongated channel-like element 12 which lies at the top of the ferrule in engagement with the head 13 of the bolt 8 and which embraces the base loop 14 of the spring 4, thereby solidly clamping the said loop 14 at the top of the ferrule. As shown in Figs. 1 and 2, the element 12 has longitudinal side flanges 15, 15 which embrace the sides of the loop 14, and at each end a depending tongue 16 which extends downwardly between the sides of the said loop. This clamp, comprising the bolt 8 and the elements 9 and 12, thereby functions to retain the tine-clamping element 7 in position in the ferrule, and also anchors the spring 4.

The form of the spacing device 3 is best illustrated in Figs. 4 and 5. As therein illustrated, this device consists of a strip of sheet metal bent into the form of a cylinder 17, one longitudinal edge of the strip being extended in a more or less tangential direction to form an outwardly curving lip 18. The cylindrical portion 17 is provided at the under side with a longitudinal series of transverse slots 19 which embrace approximately 180° of the circumference of the cylinder and which correspond in width to the breadth of the individual tines. These slots are adapted to receive the tines which seat in the bottoms of the slots and are confined in said slots by means of a rod-like key 21 which is inserted in the cylindrical portion 17 of the spacer, as shown in Fig. 5. Preferably, the tines 2 are not solidly clamped within the spacer 3 by the rod 21, so that the said tines in effect are free to move longitudinally with respect to the spacer. As illustrated, the upturned lip 18 extends forwardly over the tops of the tines and engages the latter with its curved under side at a point well in advance of the cylindrical portion 3. It will be noted that the slots 19 which receive the individual tines are formed with respect to the longitudinal axis of the cylindrical portion 17 of the spacer so as to conform to the angular relation of the individual tines with respect to said axis. In other words, each of the slots 19 is in accurate alignment with the individual tine which it is adapted to receive.

As shown in Figs. 1 and 5, the free ends of the spring 4 extend forwardly from the loop 14 through a vertically disposed spiral 22 to the spacer member 3. The terminal ends of the spring extend downwardly through apertures in the lip 18 and turn rearwardly to embrace the under side of the cylindrical portion 17. As shown in Fig. 1, the free ends of the spring diverge from the spiral 22 and engage the spacer 3 at points respectively at opposite sides of the longitudinal center of the spacer. The spring thereby functions to hold the spacer securely in proper transverse alignment, while permitting a degree of movement of the spacer in the vertical direction.

It will be noted by reference to Fig. 3 that the two tine units which form the four tines at the center of the assembly are established in a single one of the slots 6 at the forward end of the ferrule 1, and that these units adjacent the intermediate transverse section are formed with a reverse bend so as to bring the tines into the properly spaced relation. This formation of the central tine units has the further effect of affording an unobstructed space at the forward end of the ferrule for the convolutions 22 of the springs, and thereby lends a desirable compactness to the rake.

In Figs. 7 and 8, I have illustrated diagrammatically the manner in which the aforedescribed construction operates to distribute the strains imposed upon the tines in the normal operation of the rake. Fig. 7 shows a tine in its normal position of rest, and when pressure is applied through the handle in the raking operation, the tines are flexed as shown in Fig. 8. By reason of the fact that the flat untwisted body of the tine lies throughout in a single plane, the tine has a tendency to curve in a smooth arc from its offset working tip to its base in the ferrule, the flexure being thus distributed throughout the length of the tine. The spacer 3 is so formed that it does not interfere to any marked degree with this uniform flexure of the tine, nor does it cause the tine to bend sharply within the limited area of its engagement with the spacer structure. At the same time, the spring 4 acts to control the flexure of the inner portions of the tines rearwardly of the spacer member so as to afford within the assembly as a whole a degree of tension consistent with the work which the rake is intended to perform. It will be noted further that since all portions of the tines lie substantially in a common plane, there is a definite resistance throughout to lateral relative displacement of the tines, so that they tend to maintain their normal relative positions in the assembly.

It will be understood that the ferrule 1 is adapted to receive the conventional handle, and that that portion of the handle which is inserted in the ferrule is divided so as to accommodate the transverse portions of the tine units which extend through the interior of the ferrule. The handle (not shown) is positively held in place by the bolt 8 which passes through a suitably formed aperture in the latter.

I claim:
1. A rake comprising a plurality of tine units each comprising a pair of tines diverging from a connecting portion, each said unit consisting of an integral substantially flat wire-like strip of highly resilient metal of greater width than thickness and having said connecting portion and the component tines in a common plane corresponding to the flat plane of the strip, the major portions of the tines of each pair being arranged substantially in coplanar relation and said units being in nested arrangement with the respective tines and connecting portions substantially in a plane common to all of said units, a handle element, and clamping means engaging the opposite flat faces of said connecting portions and securing the said units to the handle element.

2. A rake comprising a plurality of tine units each comprising a pair of tines diverging from a connecting portion, each said unit consisting of an integral substantially flat wire-like strip of highly resilient metal of greater width than thickness and having said connecting portion and the component tines in a common plane corresponding to the flat plane of the strip, the major portions of the tines of each pair being arranged substantially in coplanar relation, a ferrule having a longitudinal series of transverse slots to receive the respective connecting portions of said units, and means for clamping said connecting portions in the slots, said units being in nested arrangement with the respective tines and connecting portions substantially in a plane common to all of said tines.

3. A rake comprising a plurality of tine units each comprising a pair of tines diverging from a connecting portion, each said unit consisting of an integral substantially flat wire-like strip of highly resilient metal of greater width than thickness and having said connecting portion and the component tines in a common plane corresponding to the flat plane of the strip, the major portions of the tines of each pair being arranged substantially in coplanar relation, a ferrule having a longitudinal series of transverse slots to receive the respective connecting portions of said units, means for clamping said connecting portions in the slots, said units being in nested arrangement with the respective tines and connecting portions substantially in a plane common to all of said units, and means engaging the tines of the assembled units intermediate their ends for maintaining said tines in predetermined spaced relation.

4. A rake comprising a plurality of tine units each comprising a pair of tines diverging from a connecting portion, each said unit consisting of an integral substantially flat wire-like strip of highly resilient metal of greater width than thickness and having said connecting portion and the component tines in a common plane corresponding to the flat plane of the strip, the major portions of the tines of each pair being arranged substantially in coplanar relation, a ferrule having a longitudinal series of transverse slots to receive the respective connecting portions of said units, means for clamping said connecting portions in the slots, said units being in nested arrangement with the respective tines and substantially in a plane common to all of said units, a substantially rigid spacer member engaging the said tines intermediate their ends, and a spring attached to said ferrule and extending into engagement with said spacer member for controlling flexure of the tines away from said common plane.

5. A rake comprising a plurality of tine units each comprising a pair of tines diverging from a connecting portion, each said unit consisting of an integral substantially flat wire-like strip of highly resilient metal of greater width than thickness and having said connecting portion and the component tines in a common plane corresponding to the flat plane of the strip, the major portions of the tines of each pair being arranged substantially in coplanar relation and said units being in nested arrangement with the respective tines and connecting portions substantially in a plane common to all of said units, and a substantially rigid spacer member engaging the tines intermediate their ends, said member comprising a tubular portion having at the under side a longitudinal series of slots for reception of the individual tines, a key inserted in said tubular portion and retaining the tines in said slots, and a lip extending from said tubular portion at the top of said tines and engaging the upper surfaces of the latter at points remote to said tubular portion.

6. A rake comprising a plurality of tine units each comprising a pair of tines diverging from a connecting portion, each said unit consisting of an integral substantially flat wire-like strip of highly resilient metal of greater width than thickness and having said connecting portion and the component tines in a common plane corresponding to the flat plane of the strip, the major portions of the tines of each pair being arranged substantially in coplanar relation and said units being in nested arrangement with the respective tines and connecting portions substantially in a plane common to all of said units, and a substantially rigid spacer member engaging the tines intermediate their ends, said member comprising a tubular portion having at the under side a longitudinal series of slots for reception of the individual tines, a key inserted in said tubular portion and retaining the tines in said slots, and a lip extending from the upper side of said tubular portion toward the outer end of the tines and having a curved portion engaging the upper surfaces of the tines at points remote to said tubular portion.

HOWARD C. JAMES.